Feb. 3, 1959 K. J. KNUDSEN 2,871,701
THERMOCOUPLE COLD JUNCTION COMPENSATOR
Filed Sept. 14, 1955
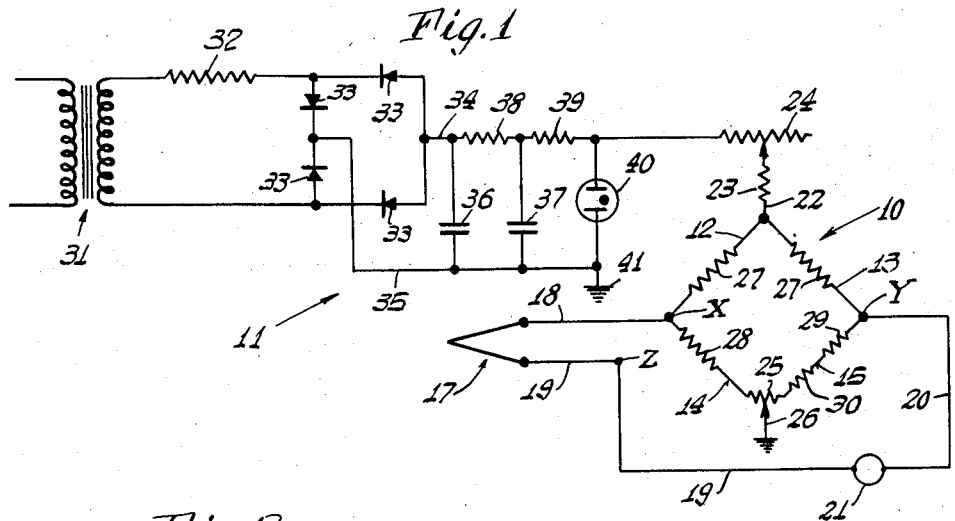
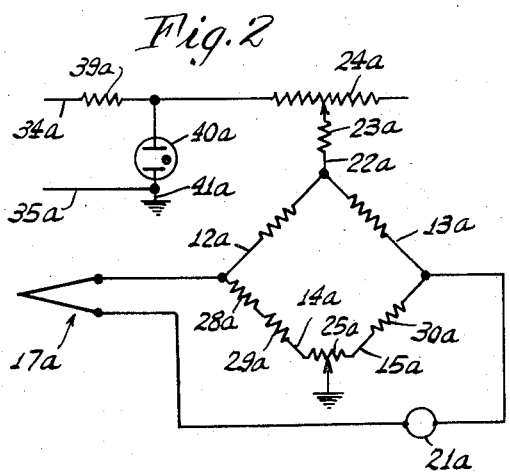
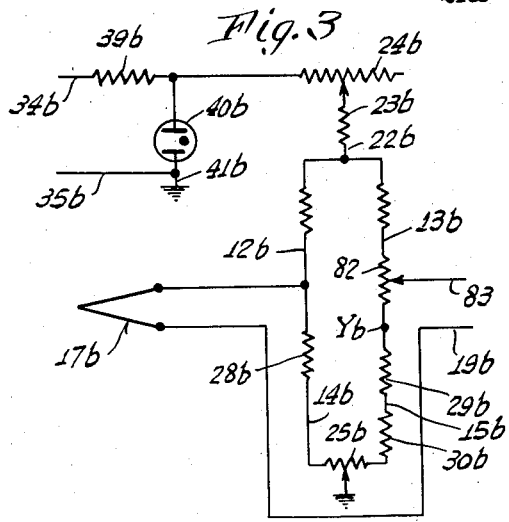
INVENTOR.
Knud J. Knudsen
BY
Johnson and Kline
ATTORNEYS United States Patent Office 2,871,701
Patented Feb. 3, 1959

2,871,701

THERMOCOUPLE COLD JUNCTION COMPENSATOR

Knud J. Knudsen, Woodbury, Conn., assignor to The Lewis Engineering Company, Naugatuck, Conn., a corporation of Connecticut Application September 14, 1955, Serial No. 534,346

6 Claims. (Cl. 73—361)

This invention relates to temperature measuring, and more particularly to an apparatus for compensating for changes in ambient temperature of a cold junction of a thermocouple.

The amount of potential developed by a thermocouple depends on the difference in temperature between the hot and cold junctions thereof. Hence, an electric meter having a scale calibrated in degrees of temperature and an indicator supposedly indicates the temperature of the hot junction when actually it only responds to the temperature difference between the hot and cold junction. Therefore, any variations in the temperature of the cold junction will create an error in the meter indication of the temperature of the hot junction. This invention provides for means for compensating for changes in the temperature of the cold junction so that the meter will accurately indicate the temperature of the hot junction.

An object of my invention is to provide for compensation of a thermocouple which produces a minimum amount of error even with an exceedingly large amount of variation in the temperature of the cold junction.

Another object of this invention is to provide compensation for variations in the temperature of the cold junction of a thermocouple for more accurately indicating the temperature of the hot junction and as compared to prior compensators wherein the error under the best conditions within the ambient temperature operating range of −70° C. to +80° C. was 1½° C., the invention disclosed herein is capable of limiting errors to a maximum value of ¼° C. over the 150° C. temperature range of the cold junction.

A still further object of my invention is to provide compensation for variations in ambient temperature of a cold junction of a thermocouple which is of simple and economical construction, lightweight, and is very accurate and reliable in operation over an extended period of use.

Another object of my invention is to provide in a cold junction temperature compensator of the above type a long-life D. C. voltage supply which rectifies an A. C. source to a substantially constant D. C. voltage even when initially started at a low ambient starting temperature.

In accomplishing the above objects, a feature of my invention is the provision of a Wheatstone bridge type compensating network in which the compensating legs have three resistors; one resistor having substantially no change in resistance with changes in temperature, a second resistor having a substantially linear increment change in resistance with changes in temperature, and a third resistor having a substantially exponential increment change in resistance with changes in temperature. By determining the positioning and value of these resistors, I have been able to have a zero error at three different temperatures compared to the usual two temperatures of compensators using only two resistors in the compensating legs. For example, with the ambient temperature range of −70° C. to +80° C., my bridge network will produce a zero error at −70° C., +80° C. and also at 0° C. The zero error at three temperatures instead of two produces an extreme accuracy of the bridge over the whole of the ambient temperature range.

Another feature of my invention is the provision in a thermocouple compensating network of a means for creating a steady, D. C. voltage supply from an alternating current source and for initially supplying the same voltage even at a low ambient starting temperature. This is accomplished by negative coefficient resistors which decrease the initially higher anode potential of a voltage stabilizer tube in the D. C. circuit to its normal voltage and as the potential decreases the resistors decrease in order to maintain the same value of voltage in the bridge. Moreover, additional negative coefficient resistors are provided to protect the diode rectifiers from breakdown when the D. C. supply is started at a low ambient temperature.

Other features and advantages will hereinafter appear.

In the accompanying drawing:

Figure 1 is a schematic diagram of my invention.

Fig. 2 is a schematic diagram of another embodiment of my invention.

Fig. 3 is a schematic diagram showing a further embodiment of my invention.

Referring to Figure 1, there is shown a schematic diagram of my invention. The cold junction compensator comprises essentially a compensating resistance bridge generally indicated by the reference numeral 10, and a stable, voltage D. C. supply generally indicated by the reference numeral 11.

The compensating bridge 10 is similar to a Wheatstone bridge and has two potentiometer legs 12 and 13 and two compensating legs 14 and 15. The potentiometer leg 12 and the compensating leg 14 are joined at the point X to form one line in the bridge, while the other line is formed of potentiometer leg 13 and compensating leg 15 joined at the point Y.

The hot junction of a thermocouple 17 has a lead 18 connected to the point X, while its other lead 19 is used as a reference wire. The lead 18 is preferably negative and the lead 19 positive when the hot junction temperature operating range is greater than the ambient temperature range of the cold junction. The point Z and the point X form the cold junction but for compensation, the points X, Y, Z and legs 14 and 15 have to be at the same ambient temperature. Another reference wire 20 is connected with the point Y of the bridge. A pyrometer 21, which is essentially a galvanometer having a scale calibrated in degrees of temperature, is connected to the leads 19 and 20. For supplying a D. C. current to the bridge, a line 22 having a resistor 23 is connected between the junction of legs 12 and 13 to a variable resistor 24. The resistor 24 is connected to the positive side of the D. C. supply source 11. The opposite junction of the bridge 10 has a variable resistor 25 and a line 26 leading to the ground or negative side of the D. C. supply. To limit the current flowing in potentiometer legs 12 and 13, like resistors 27 which may be on the order of 206,000 ohms are provided.

In prior devices employing resistors in the compensating legs of a Wheatstone bridge, there have been only two resistors employed. The resistors were selected of materials and had values which would produce some compensation, but a zero error at only two ambient temperatures. Zero error is the term for the condition existing when the meter indicates the true temperature of the hot junction caused by the compensating bridge correcting exactly for the change in ambient temperature of the cold junction. By having a zero error at only two temperatures, large errors over the major portion of the temperature range of the cold junction are introduced into the indication of the hot junction temperature. By the provision of three resistors in the compensating legs, I am able to have a zero error at three different temperatures of the cold junction, with the result that only small errors between the temperature extremes of the cold junction are present. Accordingly, there is provided a compensating resistor 28 in the leg 14, and compensating resistors 29 and 30 in the leg 15.

These resistors are formed from different materials, one resistor being formed from material having a substantially exponential resistance curve over the ambient temperature range, another resistor having a substantially linear curve of resistance over the ambient temperature range, and a third resistor formed from material having substantially no change in resistance over the ambient temperature range. One specific embodiment for selecting the values and materials which may form the resistors 28, 29 and 30 is shown below, as an example. The ambient temperature range of the cold junction is assumed as being −70° C. to +80° C. The materials employed for the example are nickel for the resistor with a substantially exponential increment change in resistance, copper for the resistor with a substantially linear increment change in resistance, and constantan for the resistor having substantially no change in resistance with temperature, though other materials having like resistance temperature characteristics may be substituted therefor. The thermocouple is formed of iridium and iridium-rhodium in this example.

In determining the balancing values of the nickel, copper and constantan compensating resistors, the following formulae are used:

$$2H = XA/B - (YD/E + Z)$$
$$2L = XC/B - (YF/E + Z)$$
$$X = Y + Z$$

where:

H = differential millivolts between +80° C. and 0° C.
L = differential millivolts between −70° C. and 0° C.
A = nickel sample resistance at 80° C. in ohms
B = nickel sample resistance at 0° C. in ohms
C = nickel sample resistance at −70° C. in ohms
D = copper sample resistance at 80° C. in ohms
E = copper sample resistance at 0° C. in ohms
F = copper sample resistance at −70° C. in ohms
X = bridge nickel at 0° C. in ohms
Y = bridge copper at 0° C. in ohms
Z = bridge constantan at 0° C. in ohms Substitution of the values into the formulae and computation results in the value of the nickel resistor 28 being 1.8015 ohms, for the copper resistor 29, 1.0012 ohms, and for the constantan resistor 30, .8003 ohm. These values will create a zero error at =70° C., 0° C. and 80° C.

The D. C. power source, generally indicated by the reference numeral 11, includes a step-up transformer 31. The input of the transformer 31 may be connected to a 115 volt, 400 cycle A. C. supply, transforming it into an output of 220 volts. One side of the output is fed through a resistor 32 (which may have a value of 70 ohms at 25° C.). The resistor 32 is desirably formed from a material which has a negative temperature coefficient of resistance, such as "Globar."

A rectifying circuit composed of semi-conductors 33 which may be silicon diodes rectifies the A. C. output and feeds the positive portion into a line 34 and the negative part into a line 35. A filter condenser 36 (which may have a value of .25 mfd.) and another filter condenser 37 (which may have a value of 1 mfd.) are connected between the lines 34 and 35. Positioned between the filter condensers 36 and 37 in the line 34 is a resistor 38 (which may have a value of 7500 ohms). Another resistor 39 (which may have a value of 7500 ohms) is also positioned in the line 34 in series with resistor 38. Connected between the lines 34 and 35 is a glow-discharge tube 40. The tube (which may be an OB2WA) has the property of its anode potential remaining practically constant at 108 volts over a wide range of current up to 30 milliamps. The positive side of the D. C. supply is connected to the variable resistor 24, while the negative side is grounded, as at 41.

When the compensating bridge and the rectifier are used in an airplane, for example, to measure the temperature of a jet engine, the temperature, when starting, of the jet engine is more apt to approach its critical limit than at any other time. The pyrometer must accordingly instantly indicate and be accurate at the time of starting. In providing for such starting accuracy, the voltage of the D. C. supply must initially be the same as its normal stabilized voltage. A voltage stabilizer tube, such as the tube 40, when initially excited at low temperatures, has a higher anode potential than after it has warmed up and become stabilized and this causes a higher D. C. supply voltage in the bridge. In order to decrease the starting voltage, the resistor 23 is placed in the connection between the D. C. supply and the bridge. Since this resistor is formed of a material having a negative temperature coefficient of resistance (such as "Globar"), at low temperatures it decreases the higher voltage caused by the tube to the normal voltage across the bridge. The resistor 23 may advantageously be placed adjacent the tube so that as the tube warms up it also warms up the resistor, decreasing its resistance as the tube stabilizes. With a value of 70 ohms at 25° C., the resistor 23 may have a value of 420 ohms at −55° C. Moreover, low temperatures cause breakdown of the silicon diodes 33 since their forward resistance at extremely low temperatures is high and varies between each diode. Consequently, the normal current would not be evenly distributed between the two sets of bridge rectifiers and the ones carrying the heavier current would break down. The resistor 32 placed in series with the rectifiers 33 decreases the current across the diodes at low starting temperatures and as the current flows through both the resistor and diodes, all become warm with the result that the resistor decreases in value as the internal resistance of the diodes decrease and become alike.

The operation of the device is as follows: The variable resistor 24 is initially adjusted and set to permit the desired current to flow in the bridge circuit. The variable resistor 25 is also adjusted and set so that the bridge will be balanced and also have a zero error at one of the three different temperatures, most conveniently at 0° C. The pyrometer 21 (which is a galvanometer having a scale calibrated in degrees of temperature) is connected between the point Y and the reference wire 19 and will indicate the temperature of the thermocouple 17. Assuming that the thermocouple 17 is maintained at 1000° C., then with an increase in the ambient temperature of the compensator above 0° C., the point Y will be of less potential than the point X. This is caused by the compensating resistor 28 in leg 14 increasing in resistance with the temperature increase more than the compensating resistors 29 and 30 in leg 15. The difference in potential between X and Y will be substantially equal to the decrease in potential of the thermocouple caused by the increase in temperature of the cold junction. The pyrometer will thus indicate substantially the temperature of the hot junction, irrespective of the temperature of the cold junction. For decreases in temperature of the cold junction below the reference temperature, the point Y will be of greater potential than the point X, and compensates by opposing the increase in potential of the thermocouple due to the decrease in temperature of the cold junction.

Shown in Fig. 2, in which like reference numerals are employed but followed by the suffix $a$ to indicate similar elements as in Fig. 1, is a diagram of another embodiment which may be used with a thermocouple having a hot junction composed of Chromel and Alumel. This embodiment differs from the first by the provision of having two of the compensating resistors in the leg 14 and one in the leg 15. This circuit results when the formula $X=Y+Z$ has a negative value for either X, Y or Z. For example, when X is positive, it is positioned in the leg 14 as in Fig. 1 when the negative lead of the thermocouple is connected to the leg 14. If calculations using different thermocouple materials and different resistance materials produce a negative value of Z, for example, then it would be positioned in the leg 14 along with the resistor X. Similarly so, if Y is negative and Z is positive, then Y would be in the leg 14.

Because of the wide range of materials and their temperature coefficients and the large differences in the potential developed by the various materials used for the thermocouple the leg 14 may have the following resistance elements therein: (1) the exponential resistance only, (2) the linear resistance only, (3) the exponential and the linear resistance, (4) the exponential and the constant resistances, and (5) the linear and the constant resistances, with the other resistor or resistors being in the leg 15.

Fig. 3 discloses a schematic diagram which uses the compensating bridge of Fig. 1 in a self-balancing circuit. Like reference numerals are employed to indicate the same elements as in Fig. 1 but are followed by the suffix b. In addition to the elements of Fig. 1, there are provided a variable resistor 82 (which may have a value of 16 ohms) and a lead 83. The resistor 82 is positioned in the potentiometer leg 13b. The other elements of the bridge are substantially the same as in Fig. 1. This circuit may be used in conjunction with an amplifier for increasing the potential between the line 19b and the wire 83, and a reversible motor driven thereby for moving the lead 83 along the variable resistor 82 until there is no potential difference between 83 and 19b. In operation, movement of the lead 83 upward on the resistor 82 makes the lead 83 more positive with respect to the point Yb. Assuming the thermocouple 17b to be at 1000° C., there will initially be a potential difference between the lines 83 and 19b. This potential difference is amplified and through a motor (not shown) will move the line 83 on the variable resistor 82 until there is no potential difference between 83 and 19b.

Variations and modifications may be made within the scope of the claims and portions of the improvements may be used without others.

I claim:

1. A Wheatstone bridge network for compensating for the variation in ambient temperature of a cold junction of a thermocouple comprising a pair of lines connected in parallel at common end points, a source of electrical energy connectible to the common end points, an output terminal formed in each line intermediate its common points providing a pair of adjacent legs of the bridge between one common point and the output terminals, and resistance means in said pair of adjacent legs for producing an exactly zero error at three different ambient temperatures, said means including a first resistor having a substantially exponential increment resistance change with a temperature change, a second resistor having a substantially linear increment resistance change with a temperature change and a third resistor having substantially no change in resistance with a temperature change, the resistance value of the exponential resistance when it is positioned in one adjacent leg exactly equaling the algebraic sum of the resistance value of the second and third resistors when they are positioned in the other of the adjacent legs at one ambient temperature at which a zero error is produced.

2. The invention as defined in claim 1 in which the first and second resistors are positioned in one adjacent leg and the third resistor is positioned in the other adjacent leg and in which the numerical sum of resistance values of the first and second resistors exactly equals the resistance value of the third resistor at the one ambient temperature.

3. The invention as defined in claim 1 in which the first and third resistors are positioned in one adjacent leg and the second resistor is positioned in the other adjacent leg and in which the numerical sum of the resistance values of the first and third resistors exactly equals the resistance value of the second resistor.

4. The invention as defined in claim 1 in which the first resistor is positioned in one adjacent leg and the second and third resistors are positioned in the other adjacent leg and in which the resistance value of the first resistor exactly equals the numerical sum of the resistance values of the second and third resistors at the one ambient temperature.

5. The invention as defined in claim 1 in which the first resistor is made from nickel, the second resistor is made from copper and the third resistor is made from constantan.

6. The invention as defined in claim 1 in which there is a thermocouple having a hot junction and a cold junction connected in series together and to the output terminals of the bridge and means electrically connected to the junctions for indicating the temperature of the hot junction.

References Cited in the file of this patent

UNITED STATES PATENTS

| | | |
|---|---|---|
| 1,094,732 | Lyle | Apr. 28, 1914 |
| 1,695,867 | Stickney | Dec. 18, 1928 |
| 2,230,779 | Johnson | Feb. 4, 1941 |
| 2,277,365 | Michael | Mar. 24, 1942 |
| 2,467,856 | Rich | Apr. 14, 1949 |
| 2,607,872 | Enabnit | Aug. 19, 1952 |
| 2,742,786 | Lemmerman | Apr. 24, 1956 |